(12) United States Patent
Lin (10) Patent No.: US 7,611,252 B1
(45) Date of Patent: Nov. 3, 2009

(54) MONITOR HOOD HAVING LIGHT-SHIELDING DOOR

(75) Inventor: Huang-Pin Lin, Taipei County (TW)

(73) Assignee: AmTran Technology Co., Ltd, Jhonghe, Taipei County (TW)

( * ) Notice: Subject to any disclaimer, the term of this patent is extended or adjusted under 35 U.S.C. 154(b) by 0 days.

(21) Appl. No.: 12/199,807

(22) Filed: Aug. 28, 2008

(30) Foreign Application Priority Data

Jul. 31, 2008 (TW) .............................. 97213567 U (51) Int. Cl.
*G02B 27/00* (2006.01)
(52) U.S. Cl. ...................................... 359/609; 359/601
(58) Field of Classification Search ......... 359/601–614, 359/819
See application file for complete search history.

(56) References Cited

U.S. PATENT DOCUMENTS

| 4,444,465 | A | * | 4/1984 | Giulie et al. ................. 359/601 |
| 6,152,567 | A | * | 11/2000 | LaForgia ..................... 359/609 |
| D586,350 | S | * | 2/2009 | Matsui et al. .............. D14/449 |

* cited by examiner

*Primary Examiner*—Thong Nguyen
(74) *Attorney, Agent, or Firm*—Winston Hsu (57) ABSTRACT

A light-shielding door is configured between an upper component and a lower component of a top plate of a monitor hood. The door is capable of moving to open or to close at an opening of the top plate along a direction. The door includes a groove and the upper/lower component includes a track corresponding to the groove for allowing the door to move steadily. A rib is configured between the two components and adjacent to the door for preventing the door from derailing. The door further includes an indentation at the bottom of a handle at the front end. When the door closes, the indentation matches closely to the edge of the opening, providing perfect light shielding solution for the monitor hood.

9 Claims, 9 Drawing Sheets

MONITOR HOOD HAVING LIGHT-SHIELDING DOOR

BACKGROUND OF THE INVENTION

1. Field of the Invention

The present invention relates to a monitor hood, and more particularly, to a monitor hood having a light-shielding door at a top plate.

2. Description of the Prior Art

In order to reduce screen glare, shade from room or window lighting, and reduce eye fatigue, more and more flat panel or regular CRT monitors adopt a monitor hood around and therefore have more delicate, vivid, and precise color output. On the other hand, color calibration for a monitor by using a color calibration device is, for many professionals, a common method to ensure that what is presented on the screen of the monitor is consistent with what is required for printed output. In such case, the monitor hood can effectively shield environmental lights and provide the color calibration device a perfect place to obtain correct color information from the screen.

Conventional monitor hoods surround the monitor and have an opening thereon for allowing the color calibration device to pass through and fix on the screen. After the color calibration device is in position, the opening turns out to be leakage of lights. Other conventional monitor hoods implement a movable door at the opening, which can be closed for shielding lights after the color calibration device is in position. Such movable doors, however, have poor fitness with the opening and leave a large gap for the connecting wire of the color calibration device. Lights around can not be perfectly shielded in the conventional monitor hoods.

SUMMARY OF THE INVENTION

The present invention provides a monitor hood having a light-shielding door and mounting on a monitor. The monitor has a top plane, a left plane, a right plane, and a screen plane. The monitor hood comprises a left plate mounted on the left plane, a right plate mounted on the right plane, and a top plate mounted on the top plane. The left plate and the right plate connect to both sides of the top plate respectively. The top plate is composed with an upper component and a lower component and has an opening on the upper component and the lower component for allowing a color calibration device to pass through and fix on the screen plane for calibration. The top plate also comprises a track along a first direction and a door having an indentation at a front end and having a groove at one side along the first direction for coupling with the track and allowing the door for moving along the first direction at the opening and for selectively moving to an opened position or a closed position. The door is configured between the upper component and the lower component. The color calibration device is allowed to pass through the opening and fix on the screen plane when the door moves to the opened position. The indentation matches closely to the edge of the opening facing the front end for shielding lights when the door moves to the closed position.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 8 is an illustration showing the door moving to the closed position and forming a hole for allowing the wire of the color calibration device to pass through.

DETAILED DESCRIPTION

Figure 1:
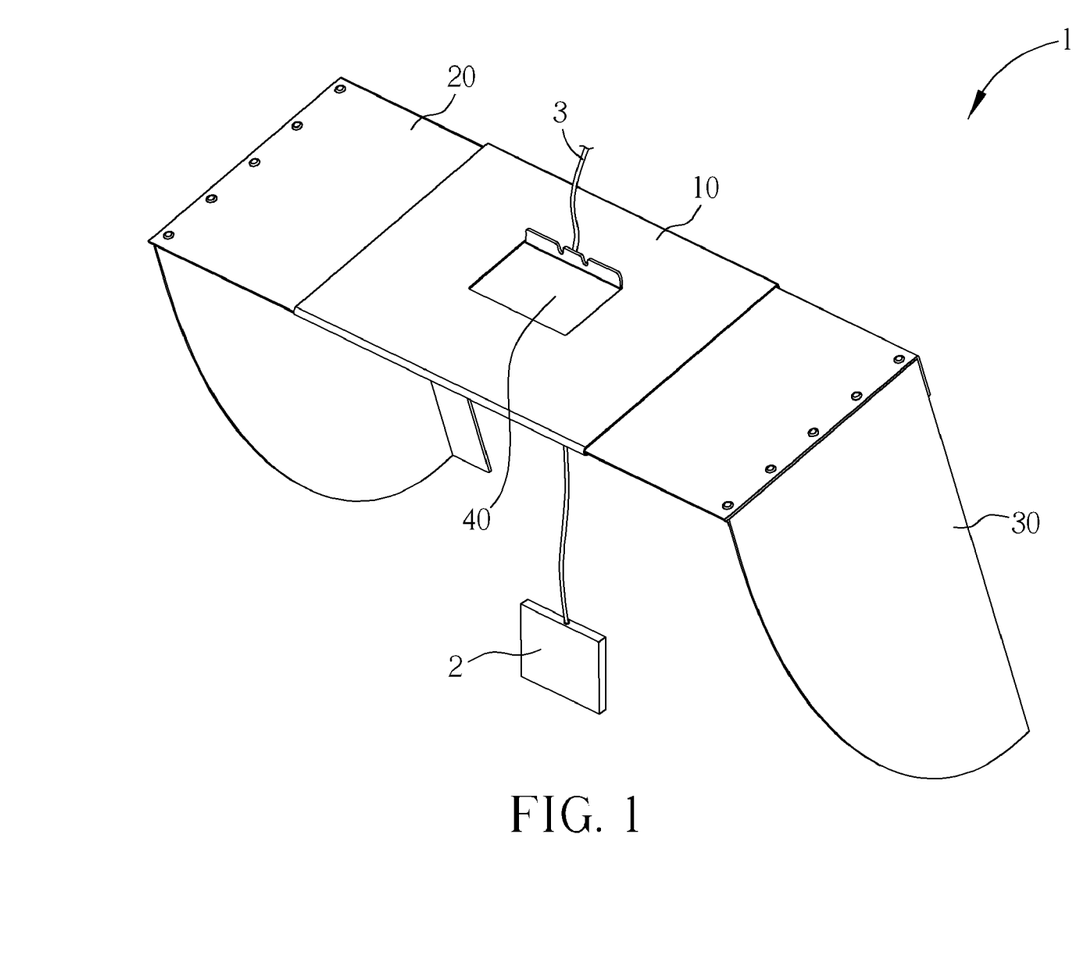
FIG. 1 is an illustration of a monitor hood having light-shielding door with a color calibration device passing through according to the present invention.
Figure 2:
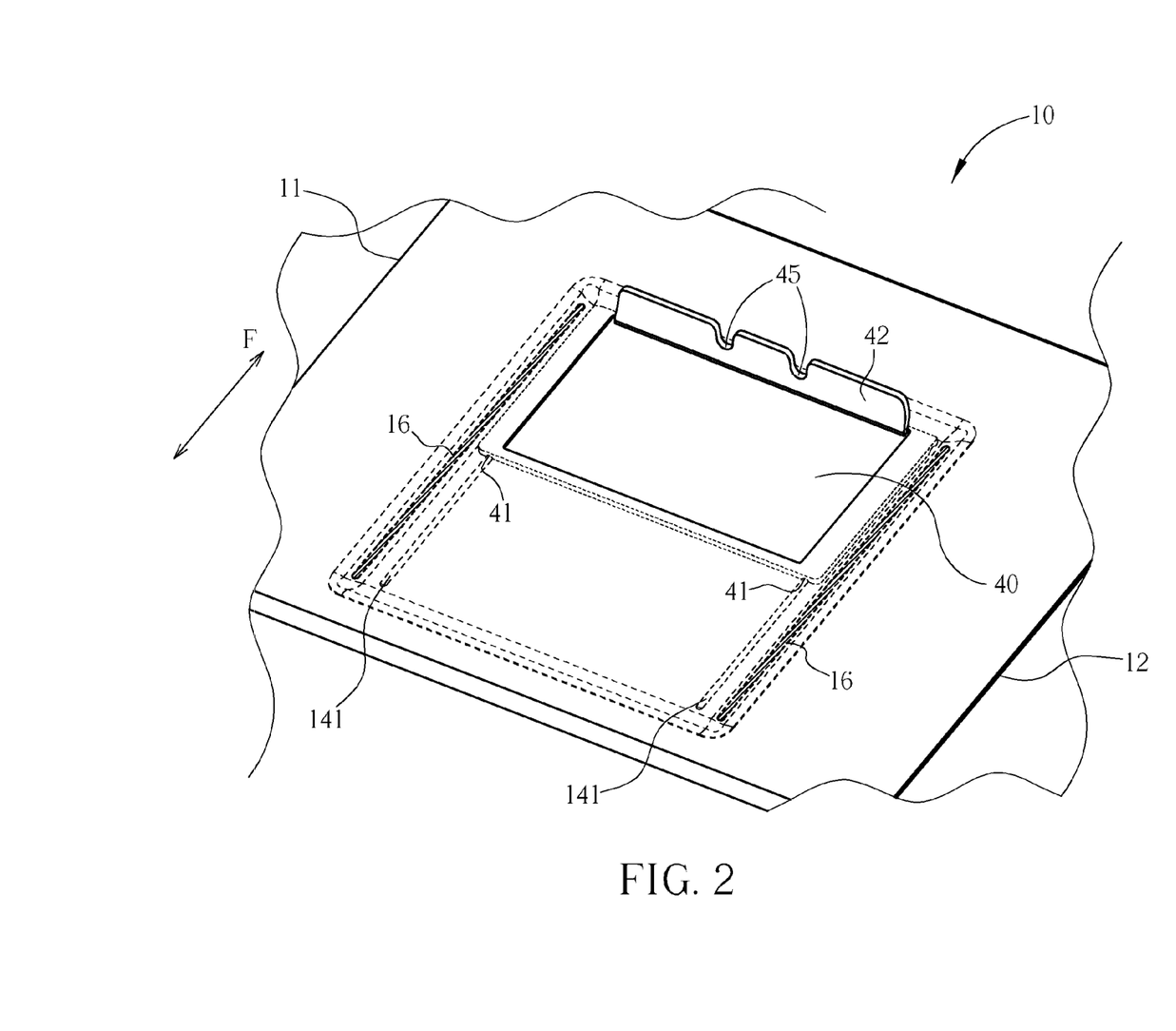
FIG. 2 is an illustration of a top plate of the monitor hood when the door is in a closed position.
Figure 9:
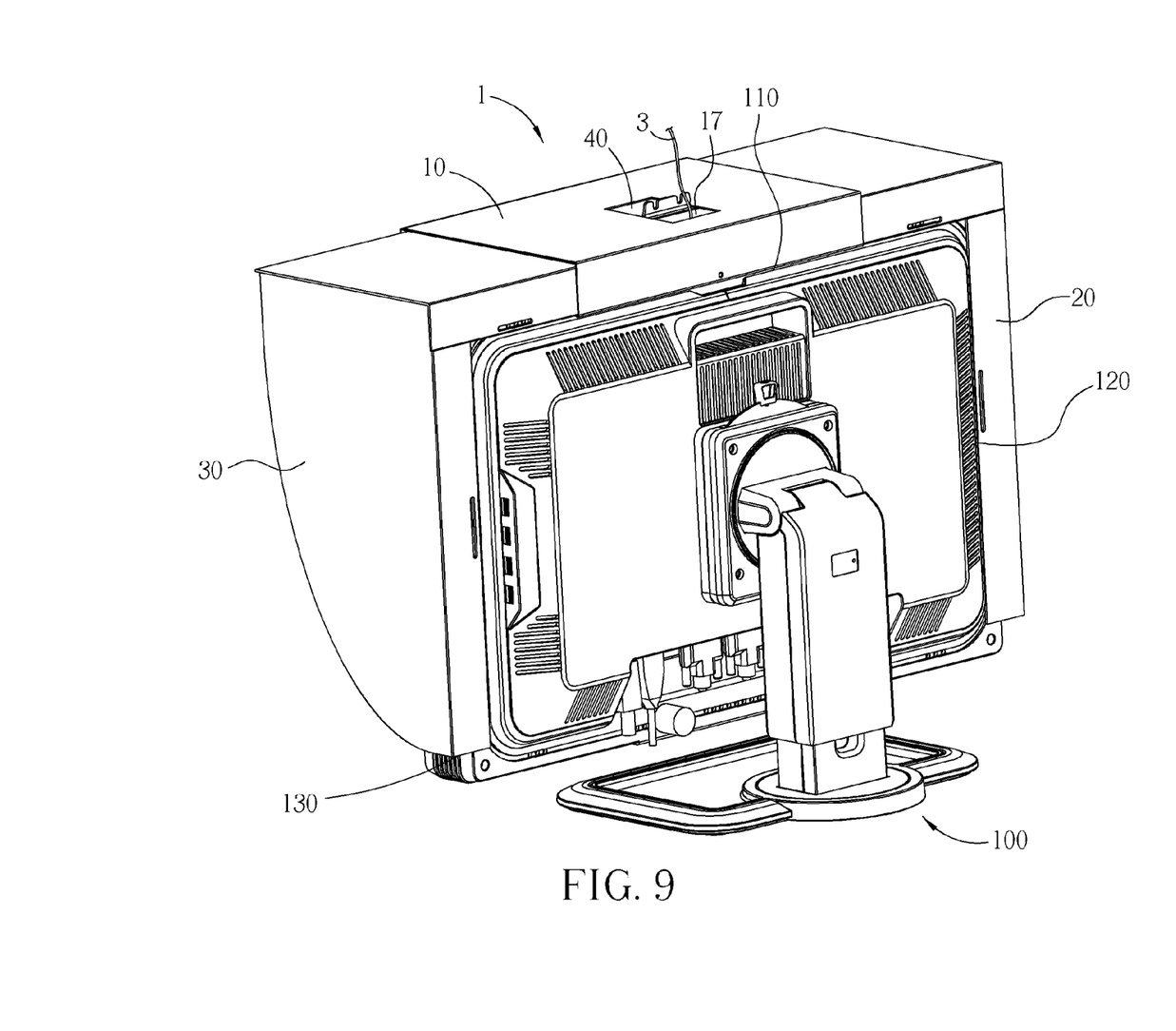
FIG. 9 is an illustration of the monitor hood mounted on a monitor.

Please refer to FIG. 1 and FIG. 9. FIG. 1 is an illustration of a monitor hood 1 having a light-shielding door 40 with a color calibration device 2 passing through according to the present invention, and FIG. 9 is an illustration of the monitor hood 1 mounted on a monitor 100. The monitor hood 1 includes a top plate 10, a left plate 20, and a right plate 30. The monitor 100 includes a top plane 110, a left plane 120, a right plane 130, and a screen plane, which is not shown in the figure. When the monitor hood 1 is mounted on the monitor 100, the top plate 10 is mounted on the top plane 110, the left plate 20 is mounted on the left plane 120, the right plate 30 is mounted on the right plane 130, and the left plate 20 and the right plate 30 connect to the left side 11 and the right side 12 of the top plate 10 respectively in a detachably way, as shown in FIG. 2, which shows a partial illustration of the top plate 10. FIG. 9 shows that the monitor hood 1 mounted on the monitor 100 forms a light-shielding enclosing structure that can effectively shield lights from above, left, and right of the monitor 100 so that the screen can be much more delicate, vivid, and correct.

Figure 3:
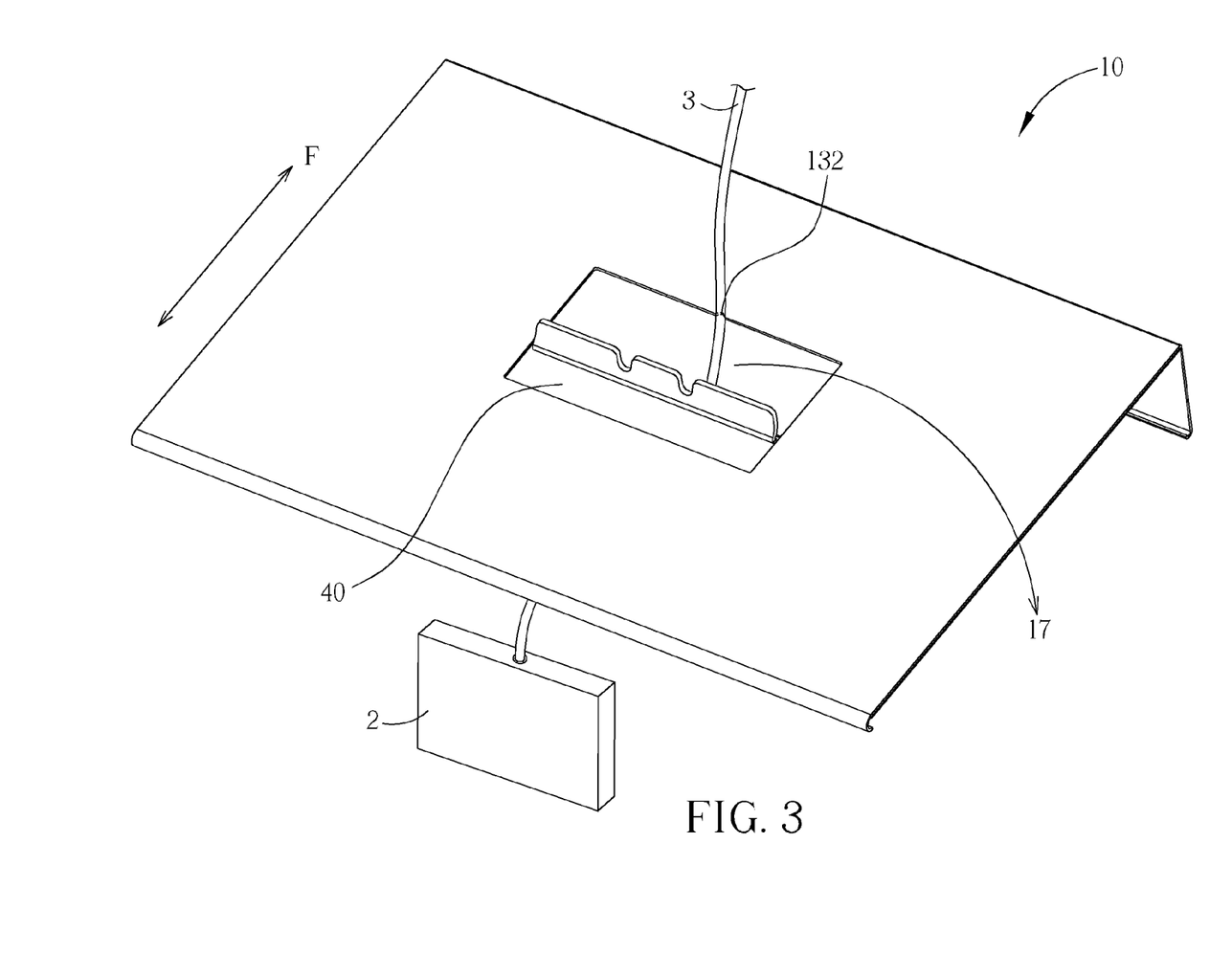
FIG. 3 is an illustration of the top plate of the monitor hood when the door is in an opened position and the color calibration device passes through an opening.

When the color calibration device 2 needs to be mounted on the screen plane of the monitor 100, the monitor hood 100 provides an opening 17 at the top plate 10 that also includes a door 40 mounted thereon and capable of moving along direction F relative to the top plate 10 to selectively set in an opened position or in a closed position. Please refer to FIG. 2 and FIG. 3. FIG. 2 is an illustration of the top plate 10 of the monitor hood 1 when the door 40 is in the closed position, and FIG. 3 is an illustration of the top plate 10 of the monitor hood 1 when the door 40 is in the opened position and the color calibration device 2 passes through the opening 17. In FIG. 3, the color calibration device 2 can pass through the opening 17 and fix on the screen plane of the monitor 100 for calibration.

Figure 5:
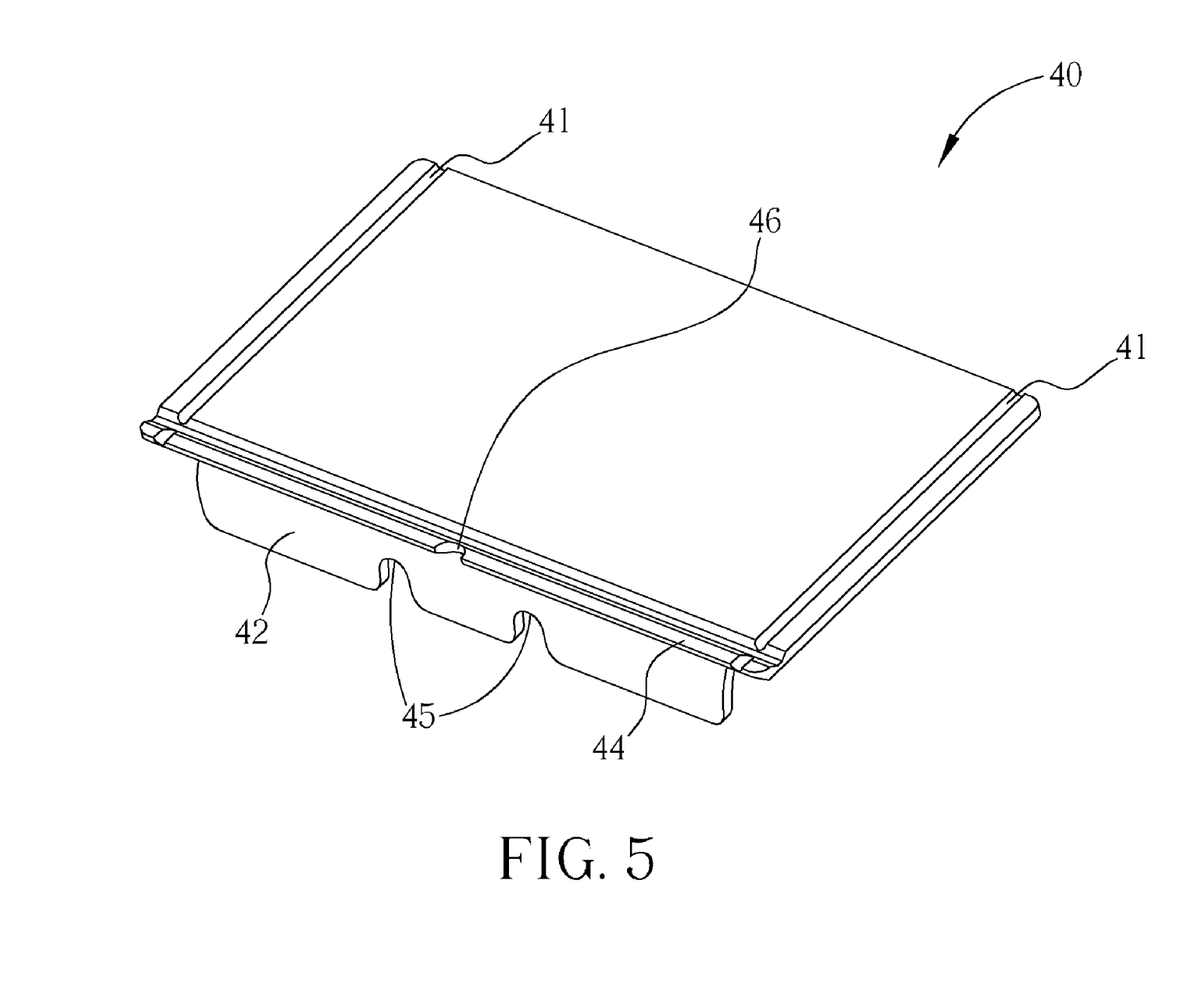
FIG. 5 is an illustration of the perspective view of the back side of the door.
Figure 7:
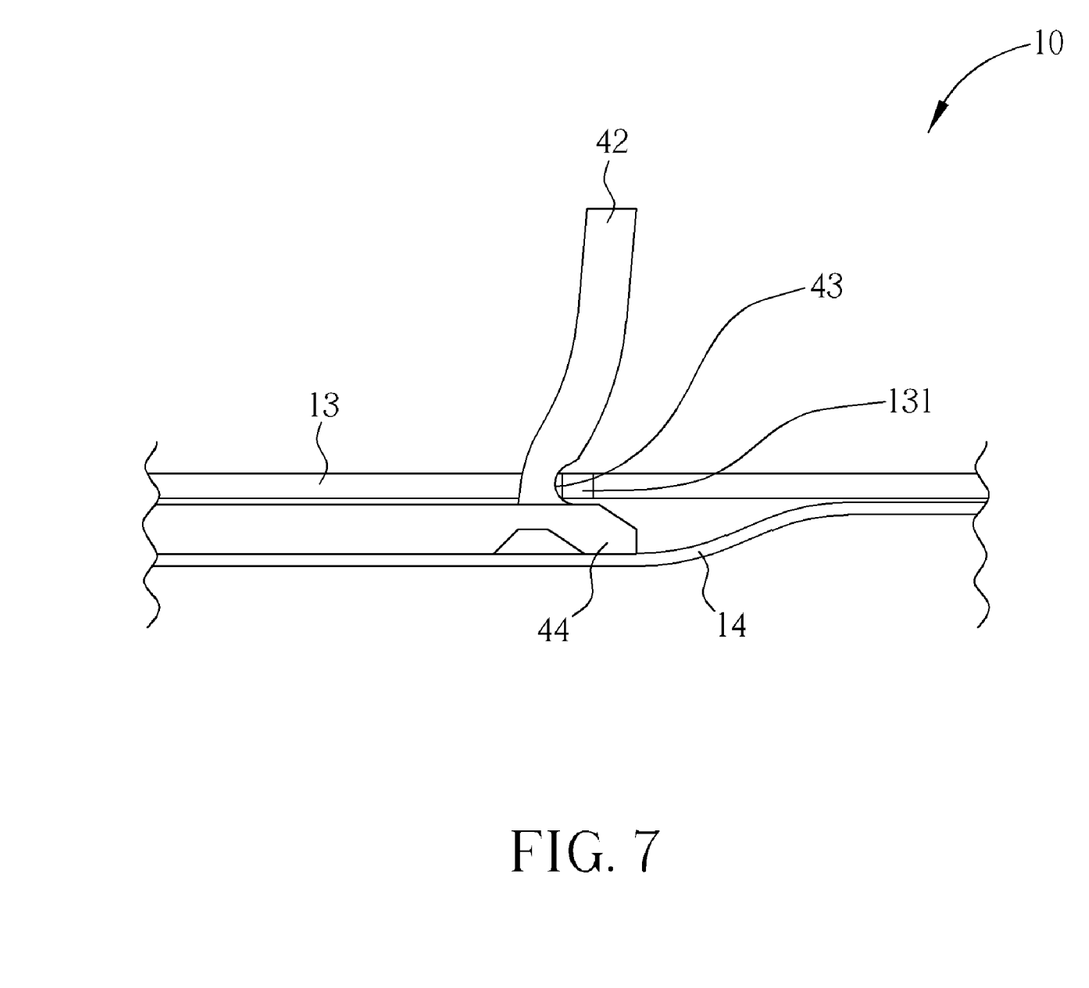
FIG. 7 is a cross-section illustration showing the door moving to the closed position in the top plate and matching closely to an upper component of the top plate.

Please refer to FIG. 2 and FIG. 7. FIG. 7 is an illustration showing the door 40 moving to the closed position in the top plate 10 and matching closely to an upper component 13 of the top plate 10. The top plate 10 of the monitor hood 1 according to the present invention is composed with an upper component 13 and a lower component 14. The door 40 is containing and movable between the upper component 13 and the lower component 14. FIG. 2 shows that the lower component 14 includes two F-direction tracks 141. FIG. 5 shows that the door 40 also includes two F-direction grooves 41 that face the lower component 14. In the embodiment, the tracks 141 and the grooves 41 can be groove and track with arc-shape cross-sections that match to each other. When the door 40 locates between the upper component 13 and the lower component 14 and is in the process of moving selectively to the opened position or the closed position at the opening 17, the grooves 41 match the tracks 141 and allow the door 40 to move more smoothly along direction F at the opening 17. To further prevent the door 40 from derailing, the top plate 10 further includes two F-direction ribs 16 configured between the upper component 13 and the lower component 14. In this embodiment, the ribs 16 can be protrusions aligning along direction F and each is configured outside the door 40, near a side edge of the door 40. As a result, the door 40 can be further confined by the two ribs 16 and move only along direction F. Additionally, in other embodiments of the present inventions the tracks 141 can also be configured on the upper component 13 for matching with the grooves 41 of the door 40, wherein the grooves 41 are configured on the upper side of the door 40 that face the upper component 13.

Figure 4:
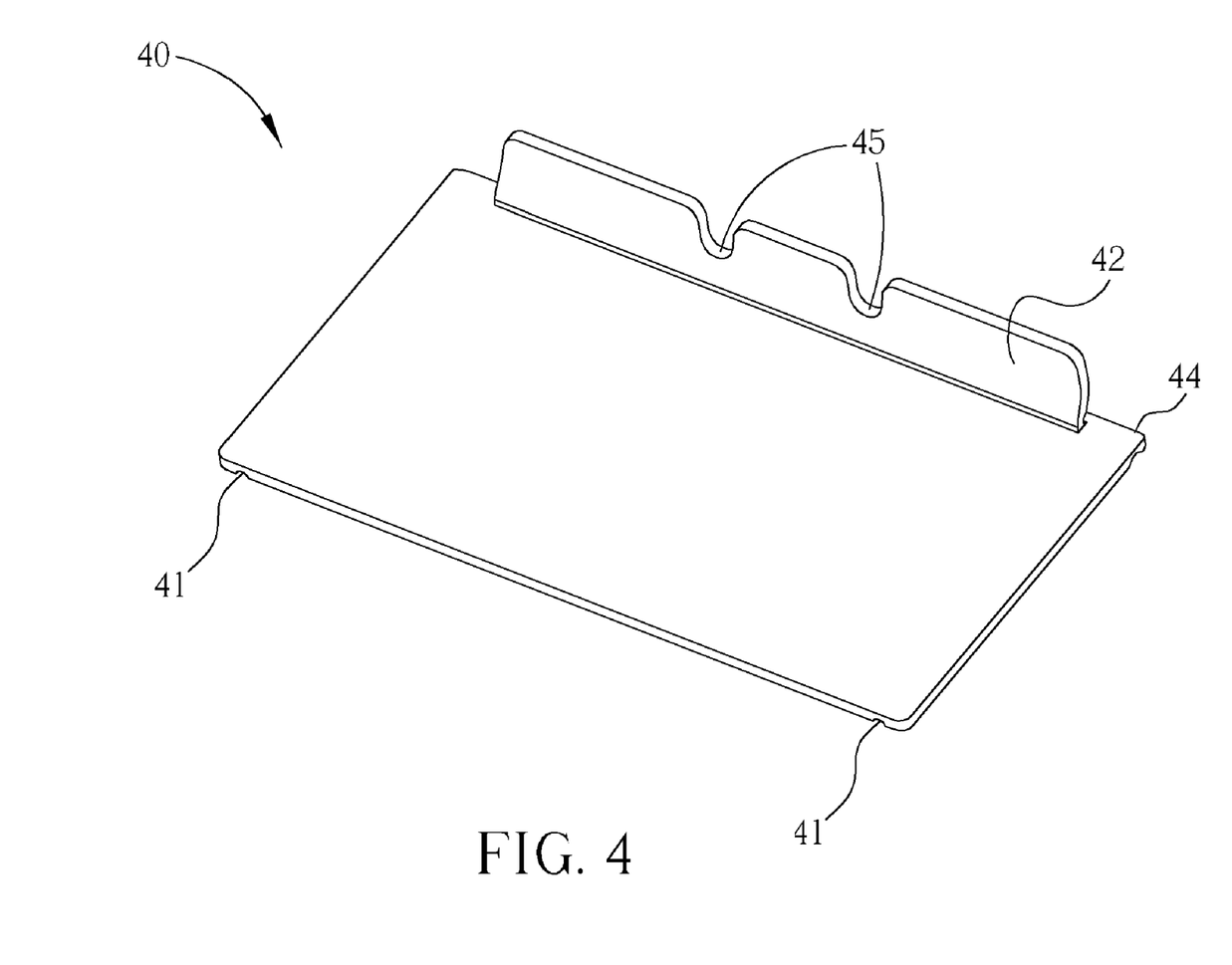
FIG. 4 is an illustration of the perspective view of the front side of the door.
Figure 6:
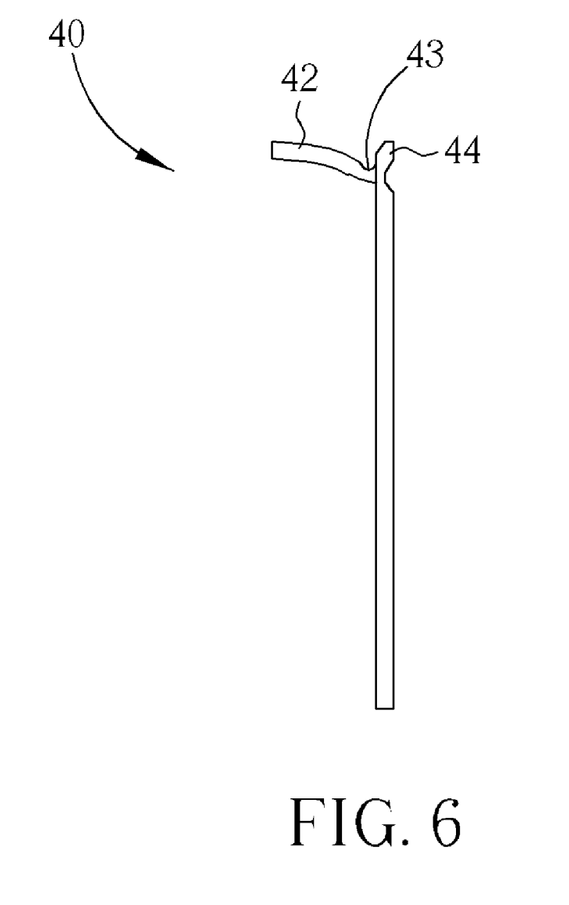
FIG. 6 is an illustration of the side view of the door.

Please refer to FIG. 4 to FIG. 6, which are illustrations of the perspective view of the front side of the door 40, the perspective view of the back side of the door 40, and the side view of the door 40 respectively. The door 40 further includes a handle 42 configured at the front end 44 for allowing users to pull the door 40 to move to the opened position or to the closed position along direction F. Down to the bottom of the handle 42 is an indentation 43, shown in FIG. 6 and FIG. 7. After the color calibration device 2 passes through the opening 17 and is fixed on the screen of the monitor 100 and then the door 40 is moved to the closed position shown in FIG. 7, the indentation 13 matches closely to the edge 131 of the opening 17 of the upper component 13 that faces the front end 44. Lights can be more thoroughly shielded when the door 40 is in the closed position.

Figure 8:
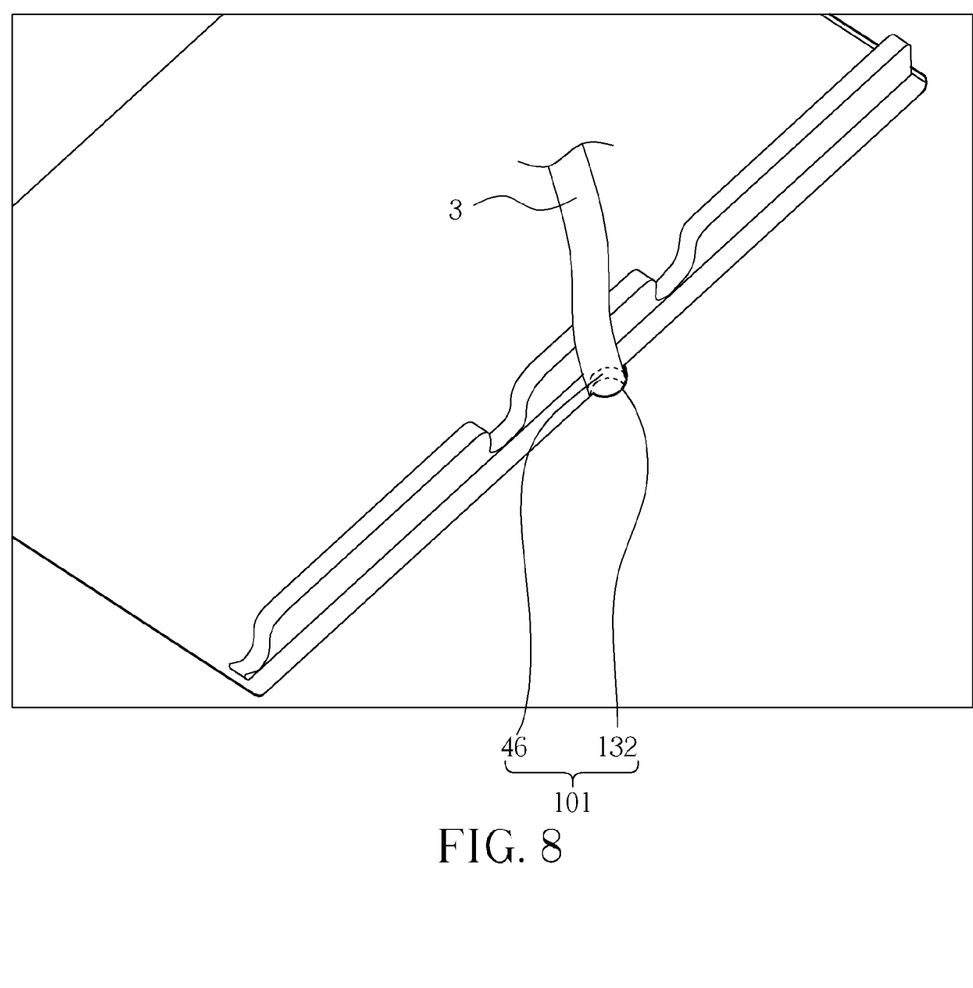

Please refer to FIG. 8. When the color calibration device 2 is fixed on the screen and the door 40 is moved to the closed position, the top plate 10 of the monitor hood 1 provides room for the wire 3 of the color calibration device 2, tightly enclosing the wire 3 for shielding lights. The door 40 has a semicircular first hole 46 (also shown in FIG. 5) at the front end 44, and the opening 17 of the top plate 10 also has a semicircular second hole 132 (also shown in FIG. 3) at the edge that faces the front end 44 of the door 40. When the door 40 moves to the closed position, the first hole 46 and the second hole 132 form a third hole 101, which has shape that fits perfectly to the cross-section of the wire 3 of the color calibration device 2. The wire 3 of the color calibration device 2 can then be completely enclosed while passing through the third hole 101. Additionally, the door 40 also includes two gaps 45 locating at the handle 42, as shown in FIG. 2 to FIG. 5, which can fasten the wire 3 of the color calibration device 2 by guiding the wire 3 through the gaps 45 and wrapping the wire 3 on the handle 42 when the door 40 is closed.

The monitor hood disclosed in the present invention has the light-shielding door configured between the upper component and the lower component of the top plate. The door is capable of moving to the opened position or to the closed position at the opening of the top plate along the first direction. The door includes the groove and the upper/lower component includes the track corresponding to the groove for allowing the door to move steadily. The rib is configured between the two components and adjacent to the door for preventing the door from derailing. The door further includes the indentation at the bottom of the handle at the front end. When the door closes, the indentation matches closely to the edge of the opening, providing perfect light shielding effect for the monitor hood.

Those skilled in the art will readily observe that numerous modifications and alterations of the device and method may be made while retaining the teachings of the invention.

What is claimed is:

1. A monitor hood having a light-shielding door and mounting on a monitor having a top plane, a left plane, and a right plane, the monitor hood comprising:
    a left plate mounted on the left plane;
    a right plate mounted on the right plane; and
    a top plate mounted on the top plane, the left plate and the right plate connecting to both sides of the top plate respectively, the top plate being composed with an upper component and a lower component and having an opening on the upper component and the lower component for allowing a color calibration device to pass through, the top plate comprising a track along a first direction and comprising:
        a door having an indentation at a front end and having a groove at one side along the first direction for coupling with the track and allowing the door for moving along the first direction at the opening and for selectively moving to an opened position or a closed position, the door being configured between the upper component and the lower component, the color calibration device being allowed to pass through the opening when the door moves to the opened position, and the indentation matching closely to the edge of the opening facing the front end for shielding lights when the door moves to the closed position.

2. The monitor hood of claim 1, wherein the top plate further comprises a rib configured adjacent to the door for confining the door to move along the first direction.

3. The monitor hood of claim 2, wherein the rib is a protrusion aligning along the first direction.

4. The monitor hood of claim 1, wherein the track is configured at the upper component of the top plate.

5. The monitor hood of claim 1, wherein the track is configured at the lower component of the top plate.

6. The monitor hood of claim 1, wherein the door further comprises a first hole at the front end and the opening comprises a second hole at the edge facing the front end, and the first hole and the second hole form a third hole for allowing a wire of the color calibration device to pass through when the door moves to the closed position.

7. The monitor hood of claim 1, wherein the door further comprises a handle at the front end and the indentation locates at the bottom of the handle.

8. The monitor hood of claim 7, wherein the handle comprises two gaps for fastening a wire of the color calibration device.

9. The monitor hood of claim 1, wherein the left plate and the right plate connect to both sides of the top plate respectively in a detachable way.

* * * * *